US012582907B2

(12) United States Patent
Nakasaka et al.

(10) Patent No.:  US 12,582,907 B2
(45) Date of Patent:     Mar. 24, 2026

(54) DISPLAY CONTROL SYSTEM, DISPLAY CONTROL METHOD, AND RECORDING MEDIUM

(71) Applicant: KONAMI AMUSEMENT CO., LTD., Ichinomiya (JP)

(72) Inventors: Noboru Nakasaka, Aichi (JP); Yoshitaka Tamura, Aichi (JP)

(73) Assignee: KONAMI AMUSEMENT CO., LTD., Ichinomiya (JP)

( * ) Notice: Subject to any disclaimer, the term of this patent is extended or adjusted under 35 U.S.C. 154(b) by 519 days.

(21) Appl. No.: 17/847,751

(22) Filed: Jun. 23, 2022

(65) Prior Publication Data

US 2022/0323863 A1      Oct. 13, 2022

Related U.S. Application Data

(63) Continuation of application No. PCT/JP2020/045705, filed on Dec. 8, 2020.

(30) Foreign Application Priority Data

Dec. 27, 2019  (JP) ................................. 2019-237698
Dec. 27, 2019  (JP) ................................. 2019-237699

(51) Int. Cl.
*A63F 13/537*          (2014.01)
*A63F 13/26*           (2014.01)

(52) U.S. Cl.
CPC ............ *A63F 13/537* (2014.09); *A63F 13/26* (2014.09); *A63F 2300/303* (2013.01)

(58) Field of Classification Search
CPC .. A63F 13/537; A63F 13/26; A63F 2300/303; A63F 13/35; A63F 13/53; A63F 13/86; A63F 13/30

(Continued)

(56) References Cited

U.S. PATENT DOCUMENTS 9,266,017 B1 *   2/2016  Parker ..................... A63F 13/77
2006/0281547 A1  12/2006  Sogabe
(Continued)

FOREIGN PATENT DOCUMENTS

CN        101981589 A      2/2011
CN        105468607 A      4/2016
(Continued)

OTHER PUBLICATIONS

Fia, "WRC eSports World Finals 2019. Season 4 Live Show", https://www.google.com/search?q=live+esports+play-by-play+2019+ live&safe=active&sca_esv=a89d269aec3ce157&rlz=1C1GCEA_ enUS1106US1106&sxsrf= AE3TifPceHMI4xqFNCWHYg0e82ZBSH16IQ%3A1749007357529 &ei=_bs_aLaAIP_l5NoP2e_GyQ8&oq=live+esports,.. Oct. 5, 2019 (Year: 2019).*

(Continued)

*Primary Examiner* — Michael A Cuff
(74) *Attorney, Agent, or Firm* — Sughrue Mion, PLLC

(57)          ABSTRACT

A display control system includes at least one memory for storing instructions and at least one processor that implements the instructions to: generate a situation message representative of a situation of a game played by at least one player using at least one game apparatus; display the situation message on a first display that is independent of the at least one game apparatus; and display, on a second display that is independent of the at least one game apparatus, a game image used to watch the situation of the game without displaying the situation message.

17 Claims, 12 Drawing Sheets

(58) Field of Classification Search

USPC ............................................................. 463/1

See application file for complete search history.

(56) References Cited

U.S. PATENT DOCUMENTS

| | | | | |
|---|---|---|---|---|
| 2009/0131177 | A1* | 5/2009 | Pearce | ..................... A63F 13/30 |
| | | | | 463/43 |
| 2017/0003740 | A1 | 1/2017 | Verfaillie et al. | |
| 2019/0118098 | A1 | 4/2019 | Payzer et al. | |

FOREIGN PATENT DOCUMENTS

| | | | |
|---|---|---|---|
| CN | 110990550 A | 4/2020 | |
| JP | 2002-239225 A | 8/2002 | |
| JP | 2006-230582 A | 9/2006 | |
| JP | 2008-289776 A | 12/2008 | |
| JP | 2010-57692 A | 3/2010 | |
| JP | 2013-17692 A | 1/2013 | |
| JP | 2013-165910 A | 8/2013 | |
| JP | 5497233 B1 | 5/2014 | |
| JP | 2016-189803 A | 11/2016 | |
| JP | 6098691 B1 | 3/2017 | |
| JP | 2018-11850 A | 1/2018 | |
| JP | 2018-114185 A | 7/2018 | |
| JP | 2018-520772 A | 8/2018 | |
| JP | 2019-205645 A | 12/2019 | |
| TW | 201442770 A | 11/2014 | |
| WO | 03/019965 A1 | 3/2003 | |

OTHER PUBLICATIONS

Manmosu Maruyama, "Presents culmination and the new version of the current 'Sengoku Taisen' !, Sengoku Taisen Official National Tournament, Report on 'The Road to Tenha 2015 national finals'", Famitsu.com, Kadokawa Game Linkage Inc., Dec. 21, 2015, pp. 1-9 (9 pages total).

International Search Report dated Feb. 22, 2021 from the International Searching Authority in International Application No. PCT/JP2020/045705.

Written Opinion dated Feb. 22, 2021 from the International Searching Authority in International Application No. PCT/JP2020/045705.

Office Action dated Apr. 29, 2022 from the Taiwanese Intellectual Property Office in TW Application No. 109145373.

Office Action dated Sep. 23, 2022 issued by the Taiwanese Patent Office in Taiwanese Application No. 109145373.

International Search Report dated Feb. 22, 2022 in Application No. PCT/JP2021/045331.

Written Opinion of the International Searching Authority dated Feb. 22, 2022 in Application No. PCT/JP2021/045331.

Notice of Reasons for Refusal dated May 2, 2023 from the Japanese Patent Office in Application No. 2020-217910.

Office Action dated Jun. 30, 2023 from the Taiwanese Patent Office in Application No. 109145373.

Japanese Office Action issued Jan. 23, 2024 in Application No. 2019-237698.

Japanese Office Action issued Jan. 23, 2024 in Application No. 2019-237699.

Extended European Search Report issued Feb. 9, 2024 in Application No. 21910352.0.

Manmosu Maruyama, "Presents culmination and the new version of the current 'Sengoku Taisen' !, Sengoku Taisen Official National Tournament, Report on 'The Road to Tenha 2015 national finals'", Famitsu.com, Kadokawa Game Linkage Inc., Dec. 21, 2015 (6 pages total) URL:https://www.famitsu.com/news/201512/21095919.html.

Decision of Refusal issued Jun. 4, 2024 in Japanese Application No. 2019-237698.

Decision of Dismissal of Amendment issued Jun. 4, 2024 in Japanese Application No. 2019-237698.

Decision of Refusal issued Jun. 4, 2024 in Japanese Application No. 2019-237699.

Decision of Dismissal of Amendment issued Jun. 4, 2024 in Japanese Application No. 2019-237699.

Office Action issued Jun. 12, 2024 in Korean Application No. 10-2022-7024273.

Office Action issued Jul. 5, 2024 in Taiwanese Application No. 112138914.

Japanese Office Action dated Oct. 3, 2023 in Japanese Application No. 2019-237698.

Japanese Office Action dated Oct. 3, 2023 in Japanese Application No. 2019-237699.

Communication dated Nov. 28, 2024 in European Application No. 21 910 352.0.

Communication dated Dec. 3, 2024 in Japanese Application No. 2023-160090.

Communication dated Dec. 19, 2024 in Korean Application No. 10-2023-7014904.

Office Action issued Feb. 20, 2025 in Chinese Patent Application No. 202080089728.X.

Office Action issued Feb. 24, 2025 in Korean Patent Application No. 10-2022-7024273.

Office Action dated Apr. 9, 2025 issued in U.S. Appl. No. 18/311,293.

Communication dated May 7, 2025 in Japanese Application No. 2023-160090.

Communication dated May 15, 2025 in European Application No. 21 910 352.0.

Chinese Office Action dated Sep. 20, 2025 in Application No. 202180086982.9.

* cited by examiner

FIG. 3

Player A has taken over the area X!
Player B has failed to take over the area X!
Player A is still ahead!

| SITUATION DATA | SITUATION MESSAGE (FIXED PART) |
|---|---|
| AREA TAKEN OVER | _____has taken over the area__! |
| FAILED | _____has failed to take over the area__! |
| SITUATION | _____is still ahead! |
| ⋮ | ⋮ |

—T

DISPLAY
CONTROL PROCESS Sa

Sa1
GENERATE SECOND
GAME IMAGE Gb

Sa2
GENERATE SITUATION
MESSAGE M

Sa3
DISPLAY COMMENTARY
IMAGE Gc ON DISPLAY 14

END

| Gb1 | | Gb2 | | | Gb3 |
|---|---|---|---|---|---|
| | U | U | U | | |

PlayerA SCORE :700

| A | | B |
|---|---|---|
| A | A | B |
| A | A | |
| A | | B |

PlayerB SCORE 700

Gc

Gc2

→ Player A has taken over the area X!
Player B has failed to take over the area X! ←
→ PlayerA is still ahead!

DISPLAY CONTROL SYSTEM, DISPLAY CONTROL METHOD, AND RECORDING MEDIUM

CROSS REFERENCE TO RELATED APPLICATIONS

This Application is a Continuation Application of PCT Application No. PCT/JP2020/045705, filed on Dec. 8, 2020, and is based on and claims priority from Japanese Patent Applications (i) No. 2019-237698 filed on Dec. 27, 2019, and (ii) No. 2019-237699 filed on Dec. 27, 2019, the entire content of each of which is incorporated herein by reference.

BACKGROUND

Field of the Invention

The present disclosure relates to games.

Description of Related Art

For example, various game events (e.g., e-sports), in which players play a game against each other, give a description of the situation of the game by a commentator. In Patent Document 1 (e.g., Japanese Patent No. 6098691), on the assumption that there are limits to useful live commentary by a commentator, live content is included in a game image based on game progress.

The technique of Patent Document 1, in which live content is included in a game image, allows for the commentator to clearly describe the situation of the game by referring to the content. However, the live content is redundant for audience members who are familiar with the game, and that is annoying.

SUMMARY

In view of the circumstances described above, an object of the present disclosure is to allow for a commentator to clearly describe a game, as well as to allow audience members to easily understand the situation of the game.

A display control system according to one aspect of the present disclosure includes: at least one memory for storing instructions and at least one processor that implements the instructions to: generate a situation message representative of a situation of a game played by at least one player using at least one game apparatus; display the situation message on a first display that is independent of the at least one game apparatus; and display, on a second display that is independent of the at least one game apparatus, a game image used to watch the situation of the game without displaying the situation message.

A game system according to one aspect of the present disclosure includes: at least one game apparatus that is used by at least one player to play a game; and a display control system configured to communicate with the at least one game apparatus, in which the display control system includes: a generation processor configured to generate a situation message representative of a situation of the game played by the at least one player; a first display controller configured to display the situation message on a first display that is independent of the at least one game apparatus; and a second display controller configured to display, on a second display that is independent of the at least one game apparatus, a game image used to watch the situation of the game without displaying the situation message.

A computer-implemented display control method according to one aspect of the present disclosure includes: generating a situation message representative of a situation of a game played by at least one player using at least one game apparatus; displaying the situation message on a first display that is independent of the at least one game apparatus; and displaying, on a second display that is independent of the at least one game apparatus, a game image used to watch the situation of the game without displaying the situation message.

A non-transitory computer-readable recording medium, according to one aspect of the present disclosure, having instructions stored therein that cause at least one processor of a computer system to: generate a situation message representative of a situation of a game played by at least one player using at least one game apparatus; display the situation message on a first display that is independent of the at least one game apparatus; and display, on a second display that is independent of the at least one game apparatus, a game image used to watch the situation of the game without displaying the situation message.

BRIEF DESCRIPTION OF THE DRAWINGS

FIG. 3 is a schematic diagram of a commentary image.

FIG. 7 is a block diagram showing an example of a configuration of a game system according to a second embodiment.

FIG. 11 is a block diagram showing an example of a structure of the game system according to a third embodiment.

MODES FOR CARRYING OUT THE INVENTION

Description will be given of embodiments according to the present disclosure with reference to the drawings. The following embodiments include various technically suitable limitations. The scope of the present disclosure is not limited to the embodiments shown below.

First Embodiment

Figure 1:
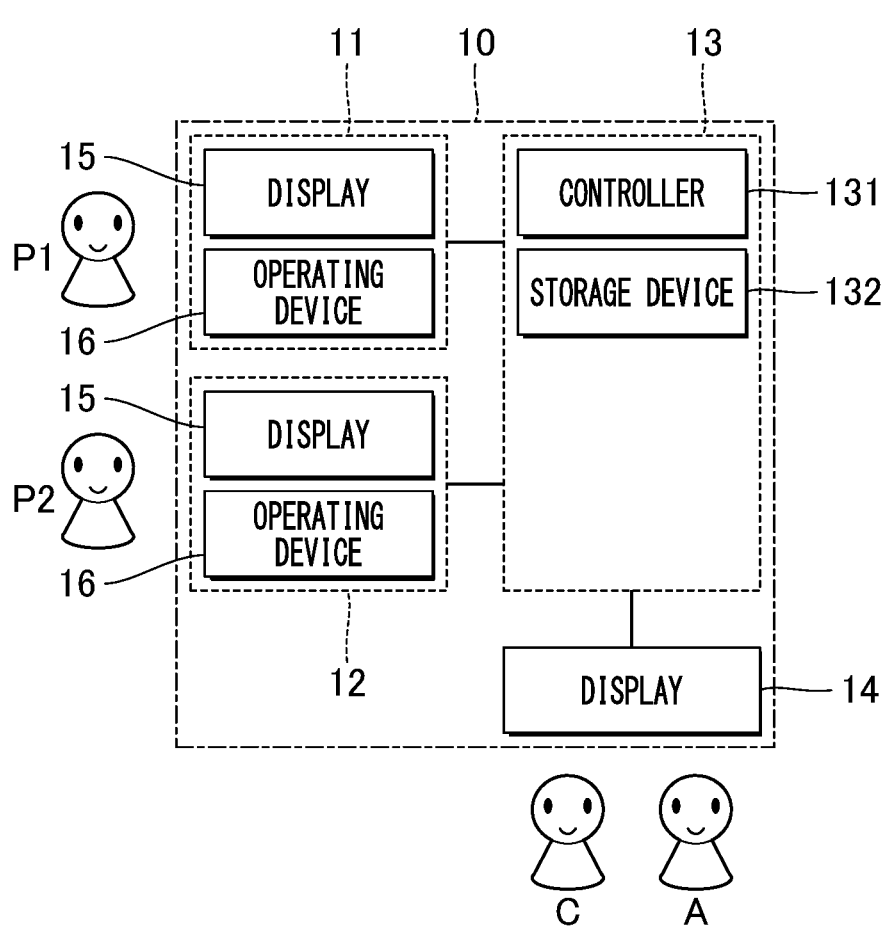
FIG. 1 is a block diagram of an example configuration of a game system according to a first embodiment.

FIG. 1 is a block diagram of an example configuration of a game system 10 according to the first embodiment of the present disclosure. The game system 10 according to the first embodiment is installed in a specific facility (hereinafter, "specific facility"). Examples of the specific facility include an entertainment facility such as a game center or a casino, a commercial facility such as a shopping center, and a hall at which various events are held.

At the specific facility, events are executed using the game system 10. In the first embodiment, an event executed in the specific facility is a game tournament (e-sport), in which players (P1, P2) play against each other in a competitive game using the game system 10. The players P are participants who play the competitive game. In the specific facility, there are a commentator C and audience members A in addition to the players P (P1, P2). The commentator C is a person who describes the situation of the competitive game along with progress of the competitive game. The audience members A are spectators who watch the competitive game.

As shown in FIG. 1, the game system 10 according to the first embodiment includes a first game apparatus 11, a second game apparatus 12, a display control system 13, and a display 14. The display control system 13 is communicable with the first game apparatus 11, the second game apparatus 12 and the display 14. For example, the first game apparatus 11, the second game apparatus 12, the display control system 13, and the display 14 are installed in a single housing. However, the first game apparatus 11 and the second game apparatus 12 may be independent of the display control system 13. Alternatively, the display 14 may be independent of the display control system 13.

The first game apparatus 11 is used by the player P1, and the second game apparatus 12 is used by the player P2, to play the competitive game. The first game apparatus 11 and the second game apparatus 12 each includes a display 15 and an operating device 16. The display 15 is a playback device that displays images. A display panel such as a liquid crystal display panel, or an electroluminescence (EL) display panel may be used for each of the displays 15. The operating device 16 is an input device that receives inputs made by the player P (P1 or P2).

The first game apparatus 11 and the second game apparatus 12 cooperate with each other to progress the competitive game. Images representative of the situation of the competitive game (hereinafter, "first game image") are displayed on each of the displays 15. A first game image representative of the situation of the player P1 is displayed on the display 15 of the first game apparatus 11. A first game image representative of the situation of the player P2 is displayed on the display 15 of the second game apparatus 12. Each of the players P plays the competitive game operating the corresponding operating device 16, while seeing the first game image displayed on the corresponding display 15. The competitive game may be progressed by a control server that communicates with the first game apparatus 11 and the second game apparatus 12. The display control system 13 may have a function for progressing the competitive game between the players P.

The competitive game according to the first embodiment is a game to obtain areas that are set up in a virtual world (hereinafter, "unit areas") by each player P, in a player's own territory. Each of the players P searches for a desired unit area and satisfies a predetermined condition (e.g., reaching a target point in the unit territory) to obtain the unit area. Each player P is able to obtain a neutral unit area that has not been obtained by either player P. Furthermore, each player P is able to obtain a unit area that has been obtained by the other player P in the past. As described above, the players P1 and P2 compete for each unit area, and either one having the highest total number of unit areas will be a winner of the competitive game.

Figure 2:
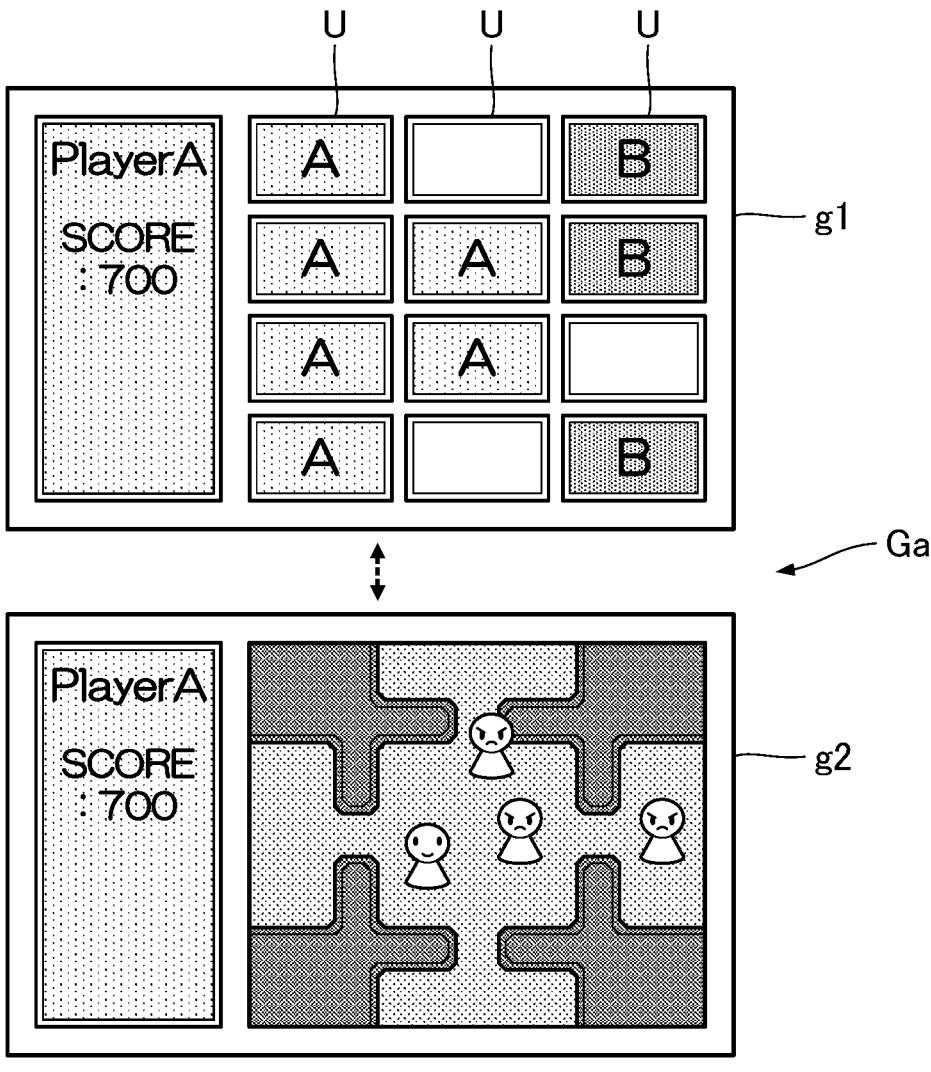
FIG. 2 is a schematic diagram of a first game image.

FIG. 2 is a schematic diagram of a first game image Ga displayed on the display 15 of the first game apparatus 11. As shown in FIG. 2, the first game image Ga is switched appropriately between a situation image g1 and an image for search g2. The situation image g1 represents a situation of the player P. Specifically, the situation image g1 represents unit areas U obtained by the player P from the unit areas U in the virtual world. The image for search g2 represents how a search event, in which each player P aims to obtain desired unit regions U, is progressing. Specifically, the image for search g2 represents how a game character operated by the player P is searching for a structure such as a cave. The situation image g1 is displayed on the display 15 before the start of, or after the end of, the search event, and it is switched to the image for search g2 in response to the start of the search event.

The display control system 13 shown in FIG. 1 is a computer system that controls the entire game system 10. The display control system 13 according to the first embodiment includes a controller 131 and a storage device 132. The display control system 13 is achieved as a stand-alone apparatus, but it may be a set of apparatuses that are independent of each other.

The controller 131 includes one or more processors for controlling each of the elements of the game system 10. Specifically, for example, the controller 131 is constituted of one or more types among different types, such as a Central Processing Unit (CPU), a Graphics Processing Unit (GPU), a Digital Signal Processor (DSP), a Field Programmable Gate Array (FPGA), and an Application Specific Integrated Circuit (ASIC).

The storage device 132 includes one or more memories that store programs executed by the controller 131 and data used by the controller 131. The storage device 132 is constituted of, for example, a known recording medium, such as a magnetic recording medium or a semiconductor recording medium. The storage device 132 may include a combination of different types of recording media.

The display 14 shown in FIG. 1 is a playback device that displays various images under the control of the display control system 13. The display 14 is, for example, a display panel, which is larger than the display 15. The commentator C and the audience members A in the particular facility are able to see images on the display 14. For example, a display panel such as a liquid crystal display panel or an organic EL display panel is used as the display 14.

Figure 3:
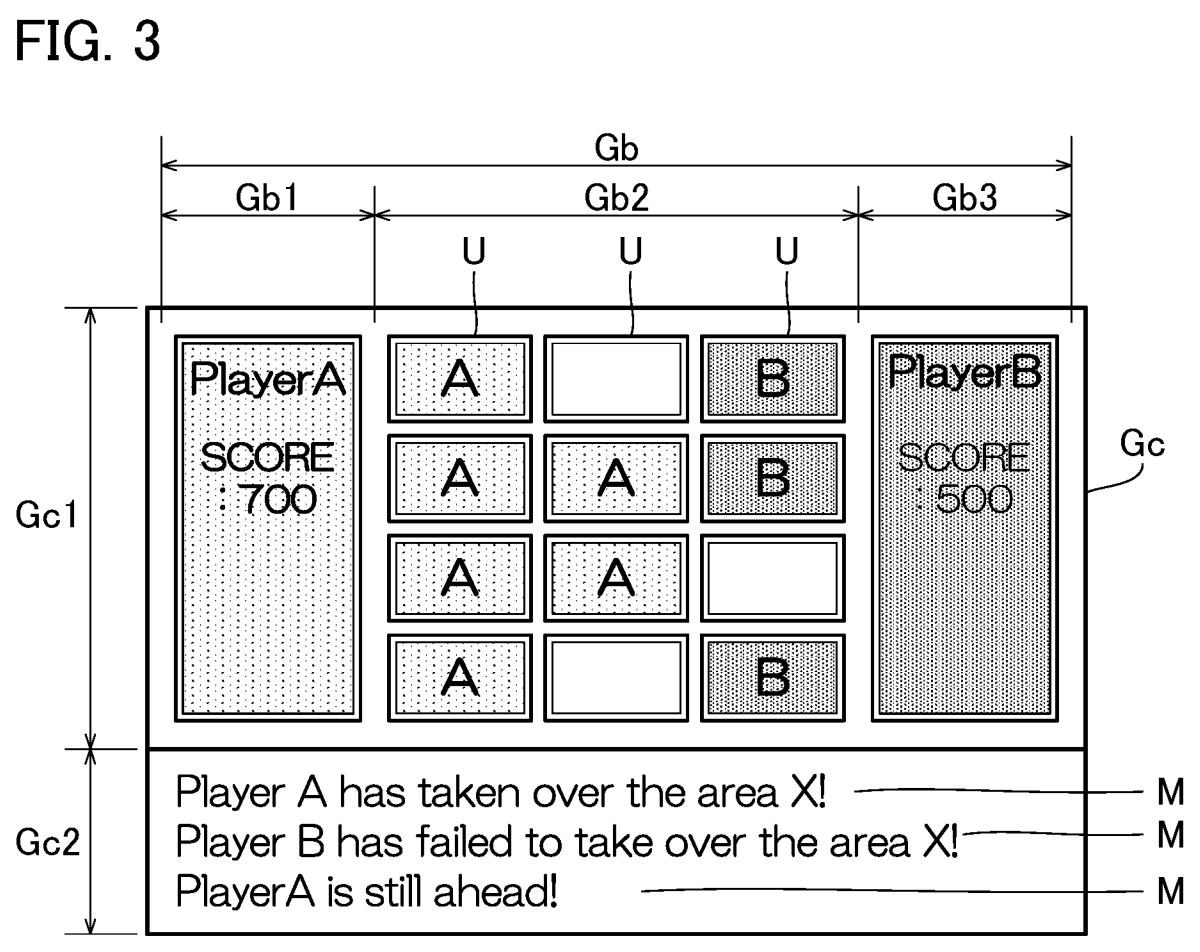

The display 14 according to the first embodiment displays a commentary image Gc shown in FIG. 3. The commentary image Gc is an image that is used for the commentator C and the audience members A to check the overall situation of the competitive game (e.g., the progress of the competition between the players P1 and P2).

As shown in FIG. 3, the commentary image Gc includes a first area Gc1 and a second area Gc2. The first area Gc1 and the second area Gc2 are fixed in the commentary image Gc. That is, the forms (sizes and shapes) of the first area Gc1 and the second area Gc2 in the commentary image Gc as well as a positional relationship therebetween remain unchanged.

A second game image Gb is disposed in the first area Gc1. The second game image Gb includes an area Gb1, an area Gb2 and an area Gb3. The second game image Gb is used to watch the competitive game. The area Gb1 is on the left of the area Gb2, and the area Gb3 is on the right of the area Gb2. In the area Gb1, the name of the player P1 ("Player A"), and the score ("SCORE") depending on the number of the unit areas U obtained by the player P1 are displayed. In the area Gb3, the name of the player P2 ("Player B"), and the score ("SCORE") depending on the number of unit areas U obtained by the player P2 are displayed. In the area Gb2, multiple unit areas U in the virtual world are displayed. Each of the following is displayed in different form (e.g., in color): (i) the unit areas U obtained by the player P1 (i.e., the territories occupied by the player P1, (ii) the unit areas U obtained by the player P2 (i.e., the territories occupied by the player P2), and (iii) neutral unit areas U that have not been obtained yet by either player P.

A situation message M is disposed in the second area Gc2 represented by the commentary image Gc. The situation message M is expressed by text indicating the situation of the competitive game. Specifically, multiple situation messages M are arranged in chronological order in the second area Gc2. For example, situation messages M indicating the following situations are displayed on the display 14:

(i) the start or results of various game events played by each player P in the competitive game, (ii) whether a condition is satisfied in an event (e.g., whether the player P1 has defeated the player P2), that is, the situation of competition in the game event, and (iii) whether each player P is dominant in the competitive game.

By seeing the second game image Gb of the commentary image Gc, the commentator C and the audience members A are able to visually and easily understand the overall situation of the competitive game (e.g., which player P is ahead). Furthermore, the commentator C is able to understand how the commentator should describe the situation by seeing the situation messages M of the commentary image Gc.

The commentator C describes the situation of the competitive game by speaking (hereinafter, "spoken commentary") while referring to the commentary image Gc. For example, the commentator C reads out situation messages M. As described above, the game system 10 according to the first embodiment has a function to assist the commentator C with description of the competitive game.

The spoken commentary by the commentator C is output to the specific facility using a broadcasting system (not shown) in the specific facility. Accordingly, the audience members A in the specific facility are able to visually understand the situation of the competitive game through the commentary image Gc displayed on the display 14. Additionally, they are able to easily understand the situation of the competitive game by listening to the spoken commentary.

Figure 4:
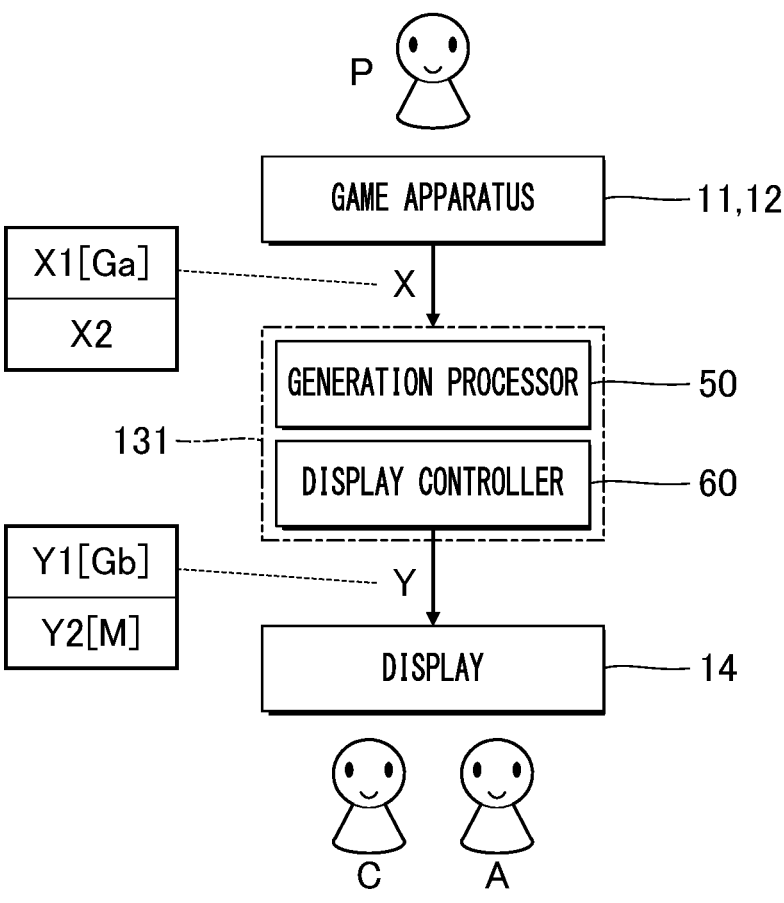
FIG. 4 is a block diagram showing a functional structure of a display control system.

FIG. 4 is a block diagram showing a functional structure of the display control system 13. As shown in FIG. 4, the controller 131 according to the first embodiment executes the programs stored in the storage device 132 to achieve functions (a generation processor 50 and a display controller 60) for displaying the commentary image Gc on the display 14.

The generation processor 50 generates a commentary image Gc. The generation processor 50 according to the first embodiment generates the commentary image Gc using data X representative of a situation of the completive game (hereinafter, "situation data"). The situation data X is sent sequentially from the first game apparatus 11 and the second game apparatus 12 to the display control system 13. For example, every time the situation of the game changes, situation data X is sent from the first game apparatus 11 or the second game apparatus 12 to the display control system 13. The generation processor 50 receives situation data X from the first game apparatus 11 or the second game apparatus 12.

As shown in FIG. 4, the situation data X includes image data X1 and progression data X2. The image data X1 represents the first game image Ga. The progression data X2 represents how the competitive game progresses. The progression data X2 represents various situations as follows:

(i) a start or results of various events, such as an event in which the players P aim to obtain unit areas U, (ii) whether a condition is satisfied in the event, (iii) changes in ability values of game characters owed by the players P, and (iv) obtaining or using items by the players P.

The generation processor 50 according to the first embodiment generates display data Y representative of the commentary image Gc. The display data Y includes image data Y1 representative of a second game image Gb, and text data Y2 representative of a situation message M. The generation processor 50 generates image data Y1 from the image data X1 and the progression data X2, and generates text data Y2 from the progression data X2.

As will be understood from the above description, the situation data X according to the first embodiment is used to generate situation messages M as well as the second game image Gb. Specifically, a part of the situation data X is used to generate the second game image Gb, and the other part thereof is used to generate the situation messages M. Accordingly, compared to a configuration in which the situation messages M are generated independently of the generation of the second game image Gb, load on the controller 131 is reduced.

Figures 5, 6:
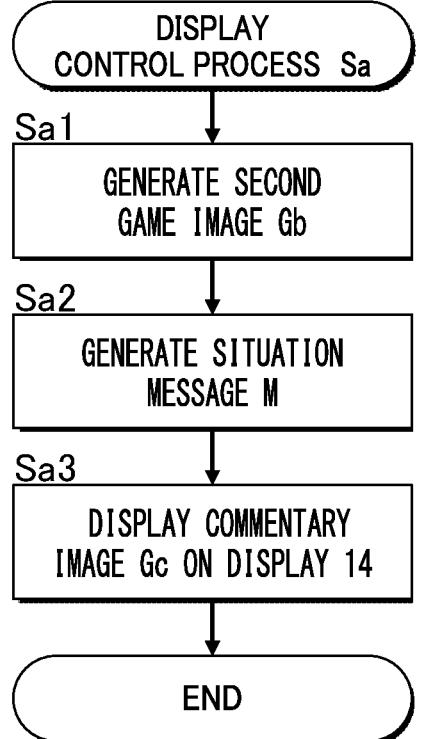
FIG. 5 is a schematic diagram of a conversion table.
FIG. 6 is a flowchart showing specific procedures of a display control process.

A situation message M includes a fixed part (e.g., "has taken over the area") that includes fixed text and is common for different situation messages M, and a variable part (e.g., "player A," "player B," etc.) that includes variable text that changes every situation. The conversion table T shown in FIG. 5 is used to generate situation messages M by the generation processor 50. The conversion table T is a data table, in which one situation represented by the situation data X is associated with one fixed part represented by the situation message M. There are registered, on the conversion table T, multiple fixed parts, each of which includes different text. The generation processor 50 searches the conversion table T for a fixed part that corresponds to the situation represented by the situation data X from among the fixed parts. Then the generation processor 50 generate a situation message M by inserting a variable part that is set based on the situation data X into the fixed part.

The display controller 60 shown in FIG. 4 displays, on the display 14, a commentary image Gc generated by the generation processor 50. Specifically, the display controller 60 sends the display 14 display data Y to show the commentary image Gc on the display 14. The generation of the display data Y by the generation processor 50 and the control of the display 14 by the display controller 60 are repeated at every reception of situation data X. That is, the commentary image Gc to be displayed on the display 14 is updated every time the display control system 13 receives the situation data X from the first game apparatus 11 or the second game apparatus 12.

FIG. 6 is a flowchart showing specific procedures of a display control process Sa, by which a commentary image Gc is displayed on the display 14 by the controller 131 according to the first embodiment. The display control process Sa is executed every time situation data X is received by the display control system 13.

The generation processor 50 generates a second game image Gb from the situation data X (Sa1). Furthermore, the generation processor 50 generates a situation message M from the situation data X (Sa2). The order of the generation of the second game image Gb (Sa1) and the generation of the situation message M (Sa2) may be reversed. The display controller 60 displays, on the display 14, a commentary image Gc including the second game image Gb and the situation message M (Sa3).

As will be understood from the above description, in the first embodiment, a commentary image Gc including situation messages M is displayed on the display 14. Accordingly, by seeing the commentary image Gc, the audience members A are able to easily understand the situation of the competitive game. In addition, by referring to the situation messages M in the commentary image Gc, the commentator C is able to clearly describe the situation of the competitive game. For example, even if the commentator C is not familiar with the competitive game in detail, or even if commentator C does not have the skill to give a description thereof, the commentator C is able to describe the situation of the competitive game accurately.

In the first embodiment, in particular, the commentary image Gc includes the second game image Gb in addition to the situation messages M. Accordingly, remarkable effects are provided such that the commentator C is able to clearly describe the situation of the competitive game.

Audience members A who are not familiar with the competitive game are able to easily accurately understand the situation of the competitive game by referring to the situation messages M along with the second game image Gb. In contrast, audience members A who are familiar with the competitive game do not need the situation messages M, and they are able to easily understand the situation of the competitive game from the second game image Gb. In the commentary image Gc according to the first embodiment, the first area Gc1, in which the second game image Gb is disposed, is fixed. In addition, the second area Gc2, in which the situation messages M is disposed, is fixed. Accordingly, compared to a configuration in which the forms (sizes and shapes) of the first area Gc1 and the second area Gc2 or a positional relationship therebetween changes, the audience members who are familiar with the competitive game are able to concentrate on the second game image Gb in the fixed first area Gc 1. Accordingly the audience members A are able to understand the situation of the competitive game without being annoyed by display of the situation messages M. As described above, according to the first embodiment, the commentator C or the audience members A who are not familiar with the competitive game, as well as the audience members A who are familiar with the competitive game are able to easily understand the situation of the competitive game.

In the first embodiment, the situation data X obtained from the first game apparatus 11 or the second game apparatus 12 is used to generate a situation message M. Accordingly, it is possible to generate situation messages M that accurately describe the situation of the competitive game.

Second Embodiment

The second embodiment according to the disclosure will be described below.

In the embodiments shown in the following, elements having the same functions as in the first embodiment are denoted by the same reference numerals as used for like elements in the description of the first embodiment, and detailed description thereof is omitted, as appropriate.

Figure 7:
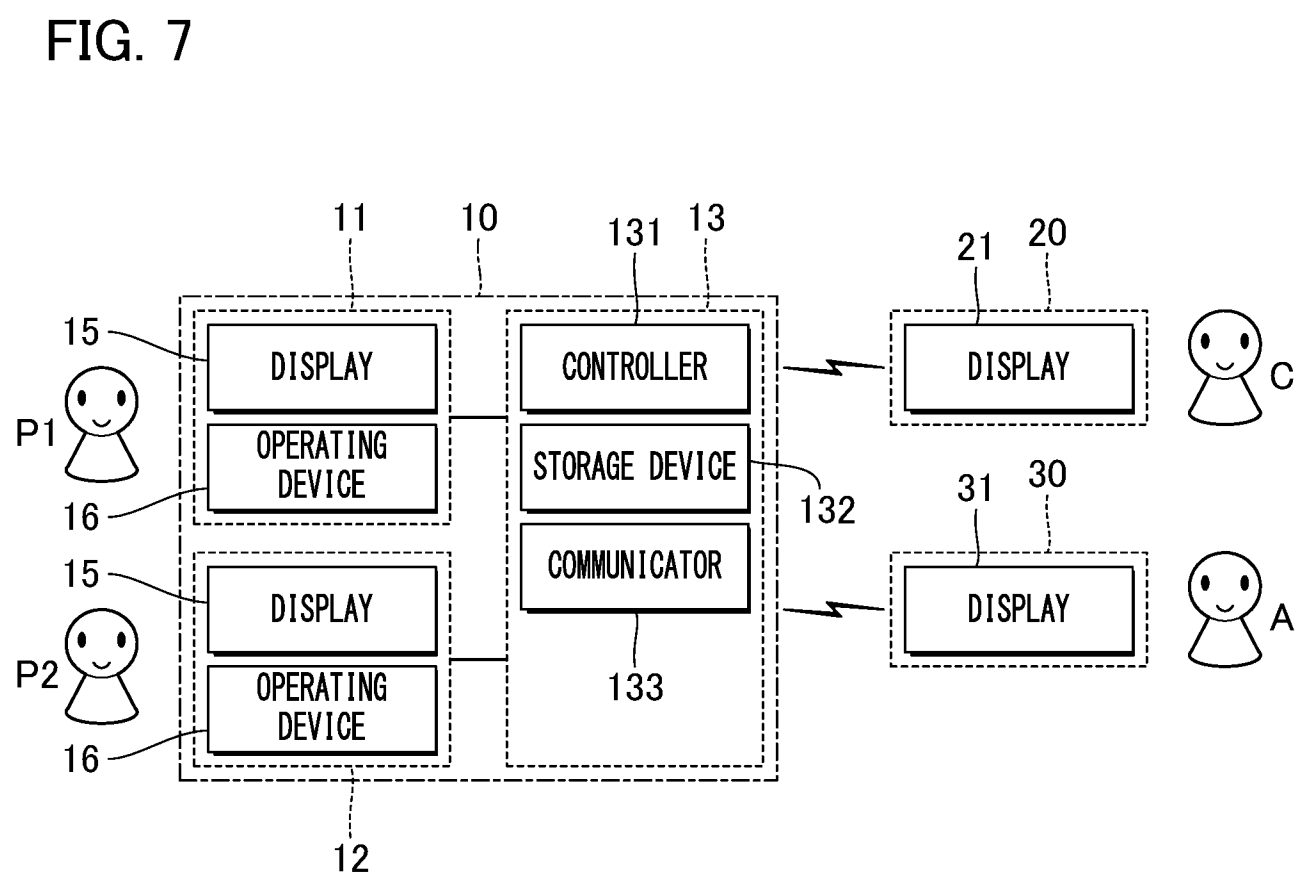

FIG. 7 is a block diagram showing an example of a configuration of the game system 10 according to the second embodiment. As shown in FIG. 7, there are players P, a commentator C and audience members A in this particular facility. The terminal apparatus 20 is used by the commentator C to describe the competitive game. The terminal apparatus 30 is used by the audience members A to watch the competitive game.

The terminal apparatus 20 and the terminal apparatus 30 are each a portable information terminal, such as a smartphone or tablet device. The terminal apparatus 20 includes a display 21. Similarly, the terminal apparatus 30 includes a display 31. Each of the displays 21 and 31 is a playback device that displays images (still or moving images). For example, a display panel such as a liquid crystal display panel, or an electroluminescence (EL) display panel may be used as each of the displays 21 and 31. Each of the displays 21 and 31 is independent of the first game apparatus 11 and the second game apparatus 12. The display 21 is an example of a "first display," and the display 31 is an example of a "second display."

The game system 10 according to the second embodiment includes the first game apparatus 11, and the second game apparatus 12 and the display control system 13, which are similar to the first embodiment. The display control system 13 according to the second embodiment includes a communicator 133 in addition to the controller 131 and the storage device 132 similar to the first embodiment. The communicator 133 communicates with the terminal apparatuses 20 and 30. The communication method by the communicator 133 is freely selectable, examples of which include, short-range wireless communication such as Bluetooth (registered trademark) and Wi-Fi (registered trademark).

The communicator 133 may communicate with the terminal apparatus 20 or 30 via a communication network such as the Internet. In a configuration in which the terminal apparatus 20 communicates with the communicator 133 via the communication network, the terminal apparatus 20 may be located outside the specific facility. Similarly, in a configuration in which the terminal apparatus 30 communicates with the communicator 133 via the communication network, the terminal apparatus 30 may be located outside the specific facility.

Figure 8:
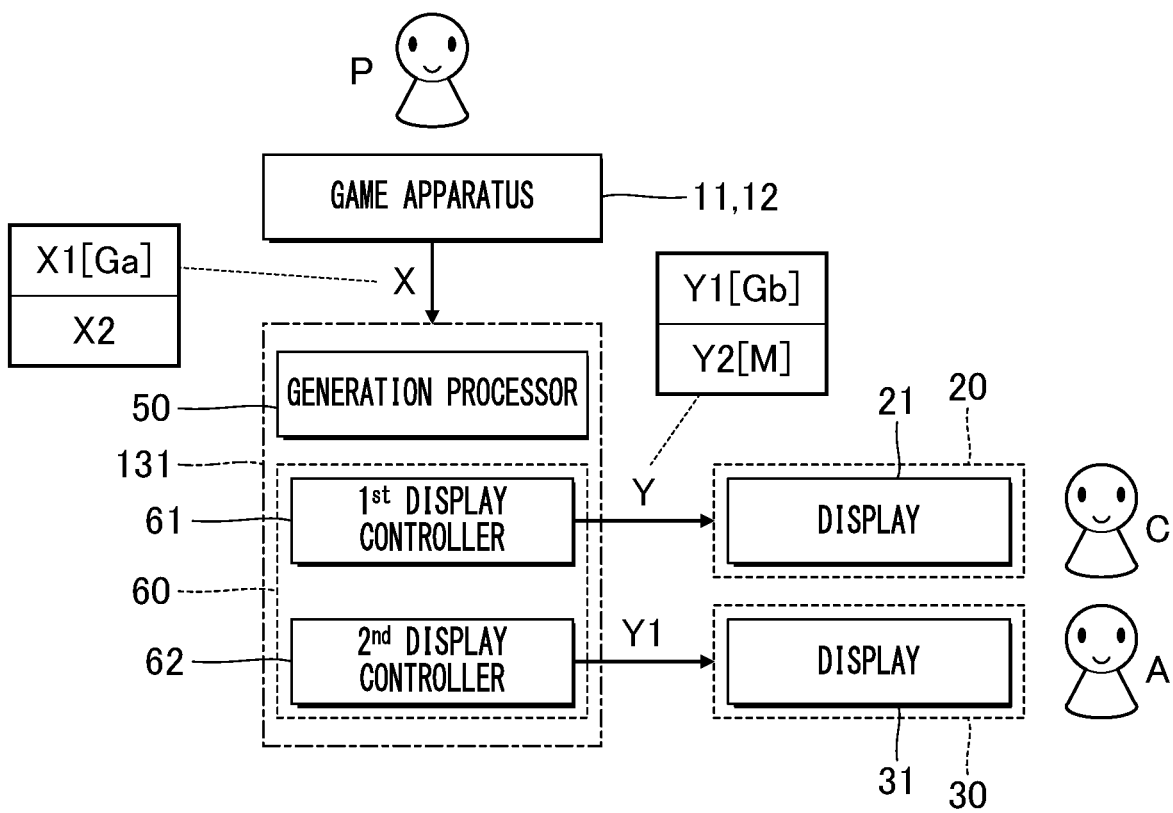
FIG. 8 is a block diagram showing a functional configuration of display control system according to the second embodiment.

FIG. 8 is a block diagram showing a functional configuration of the display control system 13 according to the second embodiment. As shown in FIG. 8, as in the first embodiment, the controller 131 according to the second embodiment executes the program stored in the storage device 132 to function as the generation processor 50 and the display controller 60.

The generation processor 50 generates a second game image Gb and a situation message M. Specifically, as in the first embodiment, the generation processor 50 generates display data Y using situation data X received from the first game apparatus 11 or the second game apparatus 12. The display data Y includes image data Y1 representative of the second game image Gb and text data Y2 representative of a situation message M, as described above.

In this configuration in which a situation message M is generated from the situation data X, as in the first embodiment, it is possible to generate accurate situation messages M to describe the situation of the competitive game.

The display controller 60 displays images on each of the displays 21 and 31. The display controller 60 according to the second embodiment includes a first display controller 61 and a second display controller 62.

The first display controller 61 displays the same commentary image Gc as in the first embodiment on the display 21 of the terminal apparatus 20. Specifically, the first display controller 61 sends the display data Y generated by the generation processor 50 from the communicator 133 to the terminal apparatus 20 to show the commentary image Gc on the display 21. The same configuration as that of the first embodiment is provided in which the first area Gc1 and the second area Gc2 of the commentary image Gc are fixed.

The identification information for the commentary-use terminal apparatus 20, which is the destination of the display data Y, is stored in the storage device 132 by a prior registration process. The first display controller 61 displays the commentary image Gc on the terminal apparatus 20, which is identified by the identification information stored in the storage device 132.

According to the foregoing configuration, as in the first embodiment, by referring to status messages M displayed on the display 21, the commentator C is able to clearly describe the situation of the competitive game. In the second embodiment, in particular, the second game image Gb in addition to the situation messages M are displayed on the display 21. Accordingly, the commentator C is able to clearly describe the situation of the competitive game, which has remarkable effects.

As in the first embodiment, the spoken commentary of the commentator C is broadcasted in the specific facility using the broadcasting system. Accordingly, the audience members A in the specific facility are able to easily understand the situation of the competitive game by listening to the spoken commentary.

Figure 9:
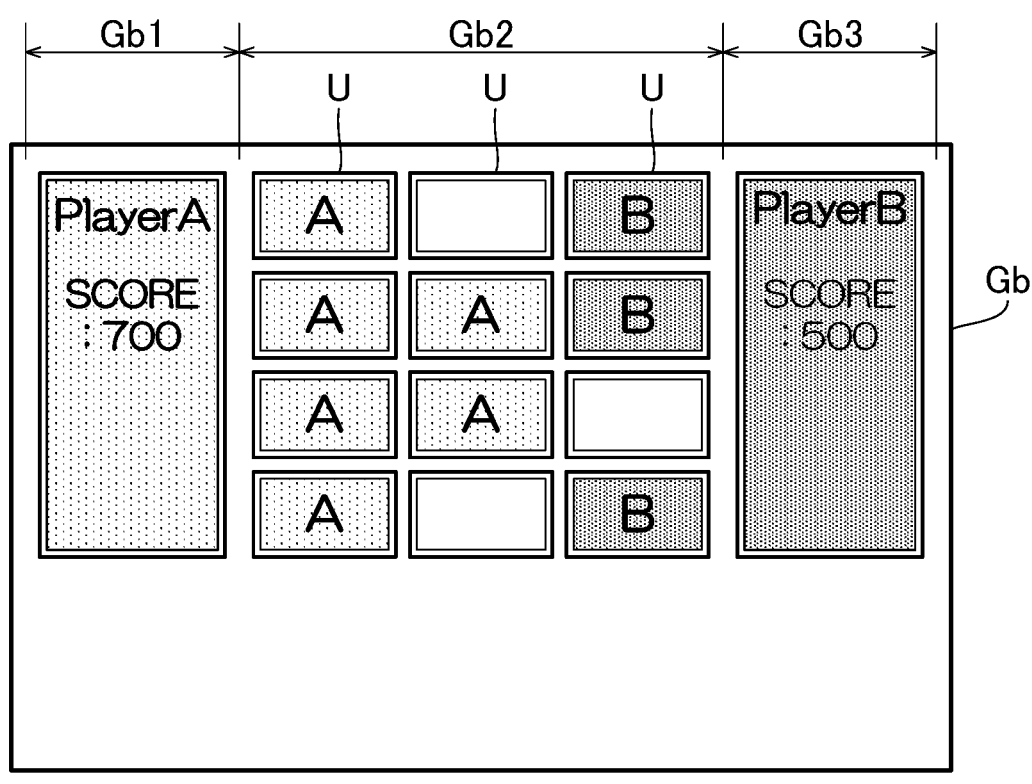
FIG. 9 is a schematic diagram of a second game image.

The second display controller 62 shown in FIG. 8 displays, on the display 31 of the terminal apparatus 30, the second game image Gb shown in FIG. 9. Specifically, the second display controller 62 sends the image data Y1 generated by the generation processor 50 from the communicator 133 to the terminal apparatus 30, to show the second game image Gb on the display 31. As shown in FIG. 9, no situation message M is displayed on the display 31. The identification information of the terminal apparatus 30 for the audience members, which is the destination of the image data Y1, is stored in the storage device 132 by a prior registration process. The second display controller 62 displays the second game image Gb on the terminal apparatus 30, which is identified by the identification information stored in the storage device 132.

Figure 10:
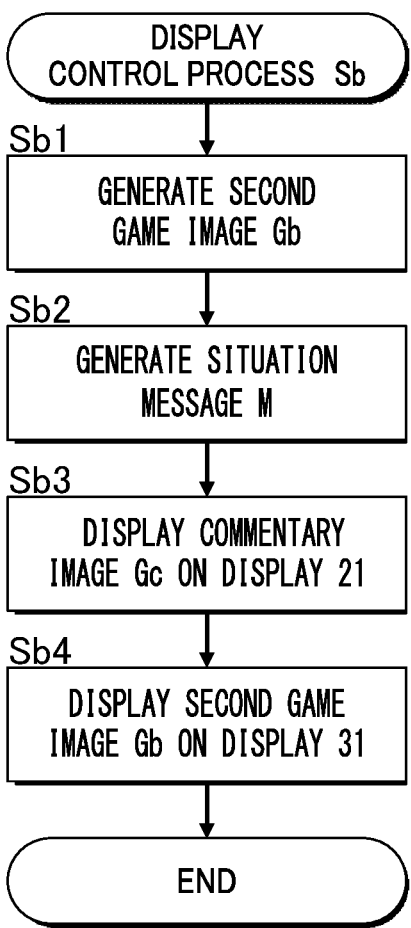
FIG. 10 is a flow chart showing specific procedures of display control process according to the second embodiment.

FIG. 10 is a flow chart showing specific procedures of display control process Sb, by which images are displayed on the displays 21 and 31 by the controller 131 according to the second embodiment. The display control process Sb is executed for each receipt of status data X.

As in the first embodiment, the generation processor 50 generates a second game image Gb and a situation message M from the situation data X (Sb1, Sb2). The order of the generation of the second game image Gb (Sb1) and the situation message M (Sb2) may be reversed.

The first display controller 61 displays, on the display 21 of the commentary-use terminal apparatus 20, a commentary image Gc including the second game image Gb and the situation message M (Sb3). The second display controller 62 displays the second game image Gb on the display 31 of the terminal apparatus 30 for the audience members (Sb4). The order of controlling the display 21 (Sb3) and controlling the display 31 (Sb4) may be reversed.

As will be understood from the above description, in the second embodiment, the first display controller 61 displays, on the display 21, the commentary image Gc including the second game image Gb and the situation messages M. Accordingly, as mentioned above, the commentator C is able to give a smooth description of the situation of the competitive game.

The second display controller 62 displays the second game image Gb on the display 31, but it does not display the situation message M. Accordingly, compared to a configuration in which situation messages M are displayed on the display 31 in addition to the second game image Gb, the audience members A who are familiar with the competitive game are able to concentrate on the second game image Gb. That is, the audience members A are able to easily understand the situation of the game without being annoyed by display of the situation messages M.

As will be understood from the above description, according to the second embodiment, the following both are achieved:

(i) the commentator C giving a smooth description of the competitive game, and (ii) the audience members A understanding the competitive game with ease.

The audience members A who are not familiar with the competitive game may not deeply understand the situation of the competitive game from only the second game image Gb. However, by referring to the second game image Gb as well as by listening to the spoken commentary of the commentator C, the audience members A are able to accurately understand the situation of the competitive game with ease.

Third Embodiment

Figure 11:
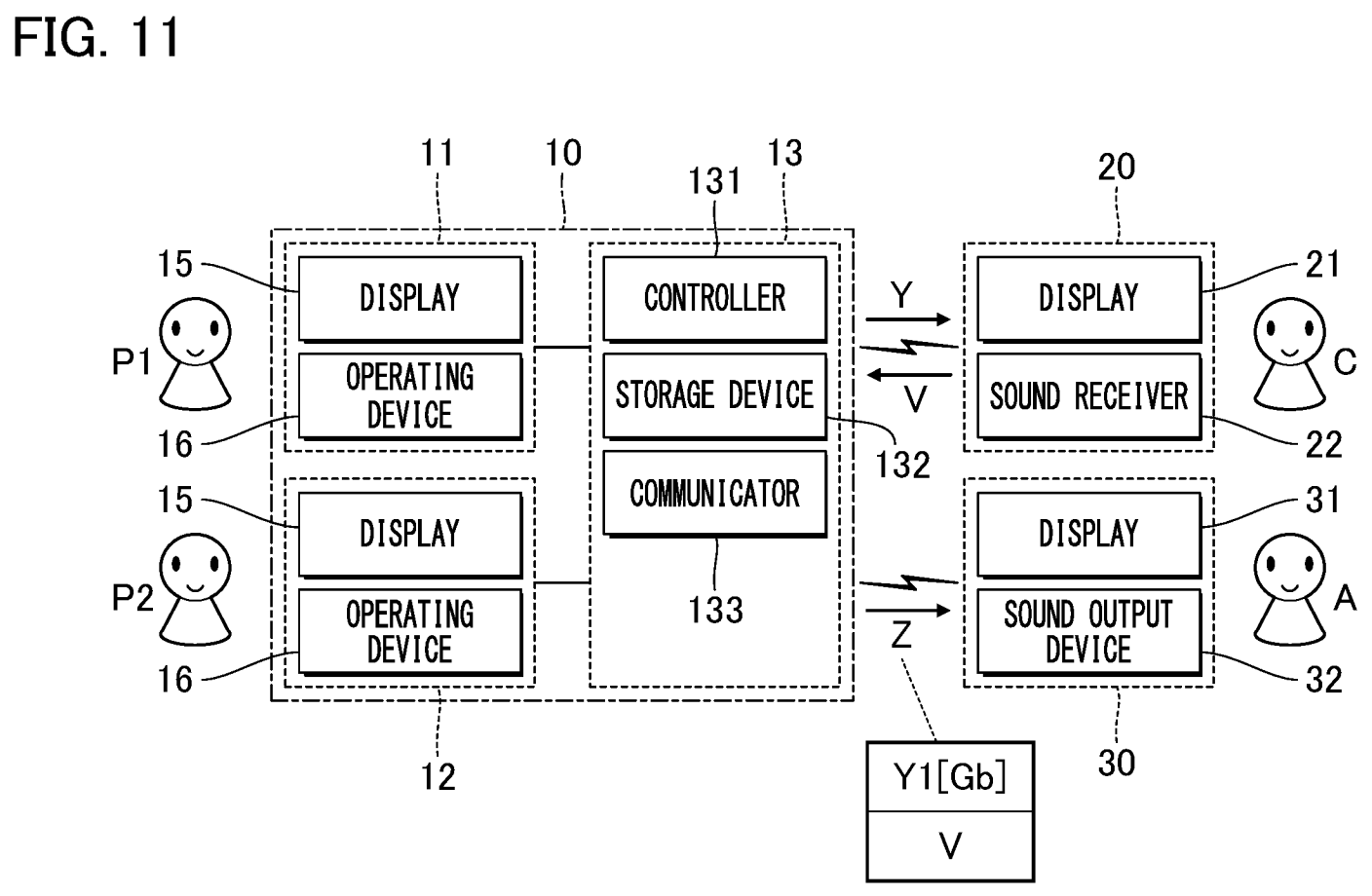

FIG. 11 is a block diagram showing an example of a configuration of the game system 10 according to the third embodiment. As shown in FIG. 11, the configuration of the game system 10 according to the third embodiment is the same as that for the second embodiment.

As shown in FIG. 11, a terminal apparatus 20 that is used by the commentator C includes a sound receiver 22 in addition to a display 21 that displays a commentary image Gc. The sound receiver 22 (e.g., microphone) receives spoken commentary from the commentator C, and generates audio data V representative of the spoken commentary. The terminal apparatus 20 sends audio data V generated by the sound receiver 22 to the display control system 13. The communicator 133 of the display control system 13 receives the audio data V that is sent from the terminal apparatus 20.

The generation processor 50 according to the third embodiment generates playback data Z in addition to display data Y including image data Y1 and text data Y2. As shown in FIG. 11, the playback data Z includes image data Y1 representative of a second game image Gb, and audio data V received by communicator 133 from the terminal apparatus 20. The second display controller 62 sends the playback data Z from the communicator 133 to the terminal apparatus 30. That is, in the third embodiment, in addition to the image data Y1 similar to in the second embodiment, the audio data V is sent to the terminal apparatus 30.

As shown in FIG. 11, the terminal apparatus 30 that is used by the audience members A includes a sound output device 32 in addition to a display 31 that displays the second game image Gb. The sound output device 32 (e.g., speaker or headphone set) outputs a spoken commentary represented by the audio data V received from the display control system 13. Accordingly, while watching the second game image Gb displayed on the display 31, the audience members A are able to listen to the spoken commentary output from the sound output device 32.

In the third embodiment, the same effects as in the second embodiment are provided. That is, by referring to the second game image Gb and the situation messages M, the commentator C is able to clearly describe the situation of the competitive game. In addition, the audience members A are able to easily understand the situation of the competitive game from the second game image Gb without being annoyed by display of the situation messages M.

Furthermore, in the third embodiment, the audio data V representative of the spoken commentary of the commentator C is sent to the terminal apparatus 30. Accordingly, the audience members A is able to listen to the voice commentary of the commentator C even if the audience members A are outside of the facility.

The audio data V received by the communicator 133 from the terminal apparatus 20 may be processed by the generation processor 50. Thereafter playback data Z including the processed audio data V may be sent to the terminal apparatus 20 by the second display controller 62.

Fourth Embodiment

Figure 12:
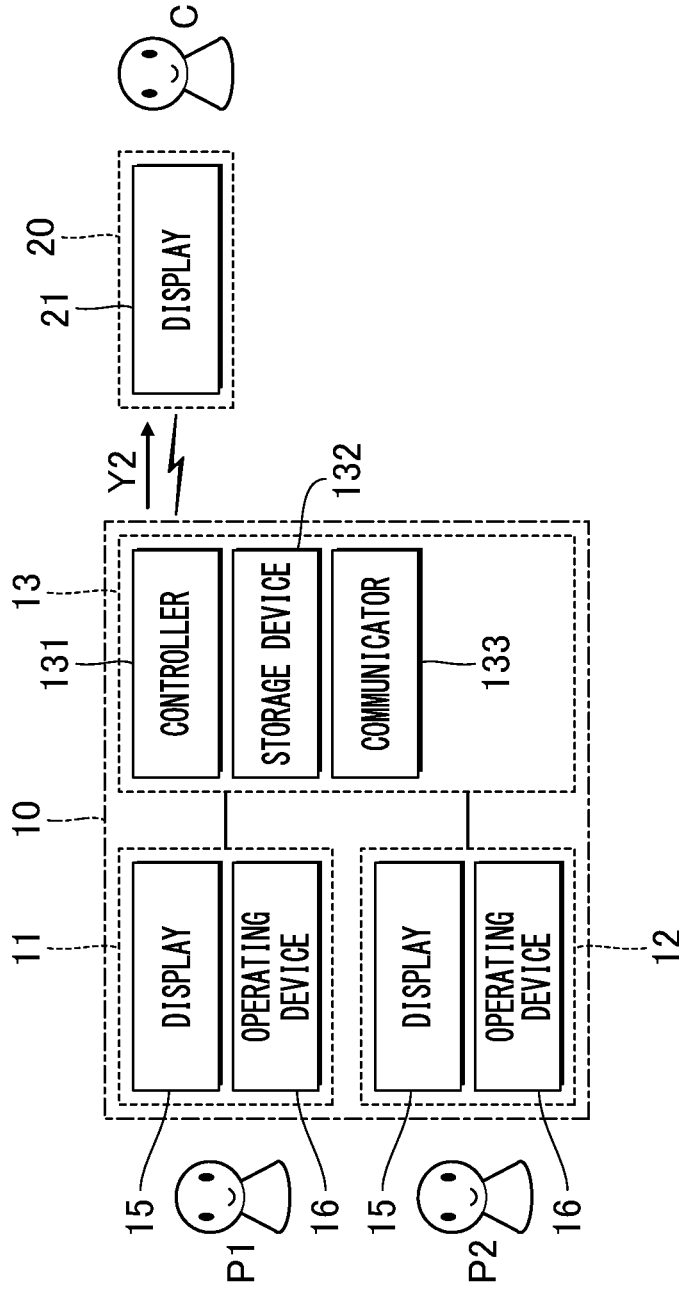
FIG. 12 is a block diagram showing a configuration of a game system according to a fourth embodiment.

FIG. 12 is a block diagram showing a configuration of a game system 10 according to the fourth embodiment. As shown in FIG. 12, the configuration of the game system 10 according to the fourth embodiment is the same as that in the second or third embodiment.

The display controller 60 (first display controller 61) according to the second embodiment displays, on the display 21 of the terminal apparatus 20, a commentary image Gc including a second game image Gb and situation messages M.

The display controller 60 according to the fourth embodiment displays the situation messages M on the display 21, but it does not display the second game image Gb on the display 21. Specifically, the display controller 60 sends the terminal apparatus 20 text data Y2 representative of a situation message M, but it does not send the terminal apparatus 20 image data Y1 representative of the second game image Gb. In the fourth embodiment, as in the second embodiment, by referring to situation messages M displayed on the display 21, the commentator C is able to clearly describe the situation of the competitive game.

In the fourth embodiment, the second game image Gb is not displayed on the display 21 of the terminal apparatus 20. Accordingly, even when the display 21 is small, it is easy to provide an area for displaying the situation messages M.

In the fourth embodiment, the commentator C is not able to see the game image (first game image Ga or second game image Gb) from the display 21. For this reason, a configuration is particularly suitable in which the commentator C is able to check the game image using a display that is independent of the display 21.

As long as the generation processor 50 generates a situation message M from progression data X2 of situation data X, then in the fourth embodiment, the following process may be omitted: the image data X1 of the first game image Ga is sent from the first game apparatus 11 or the second game apparatus 12 to the display control system 13.

Fifth Embodiment

The first game apparatus 11 and the second game apparatus 12 according to the fifth embodiment progress the situation of the competitive game to a specific situation when a predetermined condition (hereinafter, "progression condition") is satisfied. For example, when the player P gives a predetermined operation to the operating device 16, it is determined that the progression condition is satisfied, and as a result, the competitive game is progressed to the specific situation. The situation of the competitive game may be progressed when a reasonable amount of time has elapsed from the establishment of the progression condition. After the progression condition is satisfied, the competitive game is progressed to the specific situation. By this time, the first display controller 61 according to the fifth embodiment displays, on the display 21 of the terminal apparatus 20, a situation message M relating to the progressed situation of the competitive game.

For example, a case will be given in which in response to an operation made to the operating device 16 by the player P1, the situation of the competitive game is progressed to a situation in which a unit area U has been taken over by the player P1.

Before the image (first game image Ga or second game image Gb) representing that the unit area U has been taken over by the player P1 is displayed, the generation processor 50 generates a situation message M representative of success of the unit area U being taken over by the player P1. The situation message M is, for example, text "Player A has taken over the area X!." The first display controller 61 displays the situation message M generated by the generation processor 50 on the display 21 of the terminal apparatus 20. That is, before the image representing that the unit area U has been taken over by the player P is displayed, the situation message M indicating that the unit area U has been taken over by the player P1 is displayed on the display 21. Accordingly, before the competitive game is progressed to the specific situation, the commentator C sees the situation message M and is able to understand the situation. Therefore, the commentator C is able to describe the situation without delay in relation to the progress of the competitive game.

In the fifth embodiment, the same effects as in the second embodiment are provided. In the above description, the same configuration as the second to fourth embodiments has been described in which situation messages M are displayed on the display 21 of the terminal apparatus 20. However, the configuration of the fifth embodiment, in which before the competitive game is progressed to the specific situation, the situation messages M relating to the situation are displayed, can be applied to the first embodiment in which the situation messages M are displayed by the display 14.

In the above description, when the progression condition for progressing the situation of the competitive game is satisfied, the first display controller 61 displays a situation message M relating to the progressed situation on the display 21 (display 14 in the first embodiment). However, the generation processor 50 may predict the progress of the competitive game, and the display controller 60 may display a situation message M representative of a result of this prediction on the display 21. For example, the generation processor 50 predicts a future situation of the competitive game based on the previous situation of the competitive game and content of the operation made to the operating device 16 by the player P. Then generation processor 50 generates a situation message M based on the result of this prediction.

Sixth Embodiment

The display control system 13 according to the sixth embodiment operates in response to any of the operation modes including a first operation mode and a second operation mode. The controller 131 selects any of the operation modes in response to an instruction from, for example, an administrator who works for the particular facility.

The first operation mode is for assisting the commentator C with description of a commentary. In the first operation mode, as in the first embodiment, the generation processor 50 generates a commentary image Gc including a second game image Gb and a situation message M. The display controller 60 displays a commentary image Gc on the display 14 or 21.

The second operation mode is for not taking into consideration commentary of the commentator C. In the second operation mode, the generation processor 50 does not generate situation messages M. The display controller 60 displays the second game image Gb on the display 21 or 14. That is, in the second operation mode, the display controller 60 does not display situation messages M on either the display 21 or 14.

In the sixth embodiment, the same effects as in the first embodiment are provided.

Furthermore, in the sixth embodiment, in particular, flexible operation based on a level of knowledge or ability of the commentator C is provided. For example, if the commentator C is not familiar with the competitive game or if the commentator C does not have the skill to give a description thereof, the first operation mode is suitable for assisting the commentator C. In contrast, if the commentator C is familiar with the competitive game or if the commentator C has the skill to give a description thereof, display of the situation messages M are omitted, and therefore the commentator C is able to concentrate on the second game image Gb.

Modifications

The embodiments described above may be modified in various ways. Examples of specific modifications that are applied to the embodiments will now be described. Two or more modes freely selected among the following may also be combined as long as they do not conflict.

In the following description, the display 14 according to the first embodiment as well as the display 21 according to the second to fourth embodiments are referred to as "commentary-use displays."

(1) In the foregoing embodiments, the image data Y1 representative of the second game image Gb is generated based on the image data X1 representative of the first game image Ga and the progression data X2. As described below, the specific method of generating the second game image Gb is freely selectable.

First, the first game image Ga may be used as the second game image Gb. Specifically, either of the following is selected and displayed: the first game image Ga to be displayed on the display 15 of the first game apparatus 11, or the first game image Ga to be displayed on the display 15 of the second game apparatus 12. The second game image Gb may be generated by performing various image processing including encoding on the first game image Ga.

The second game image Gb may be generated based on the situation represented by the progression data X2. For example, the progression data X2 (replay data) includes operation data representative of operations made to the operating device 16 of the first game apparatus 11 or the second game apparatus 12 by the player P. The second game image Gb may be generated using this progression data X2.

As will be understood from the above description, the situation data X may not include the image data X1 representative of the first game image Ga.

In the foregoing embodiments, an example configuration has been describe in which the situation data X includes the image data X1 and the progression data X2. However, the image data X1 and the progression data X2 may be each sent, as individual situation data X, from the first game apparatus 11 or the second game apparatus 12 to the display control system 13. That is, the following (i) and (ii) may be separately sent to the display control system 13:

(i) the situation data X (e.g., image data X1) that is used to generate a second game image Gb, and (ii) the situation data X (e.g., progression data X2) that is used to generate a situation message M.

Figures 13, 14:
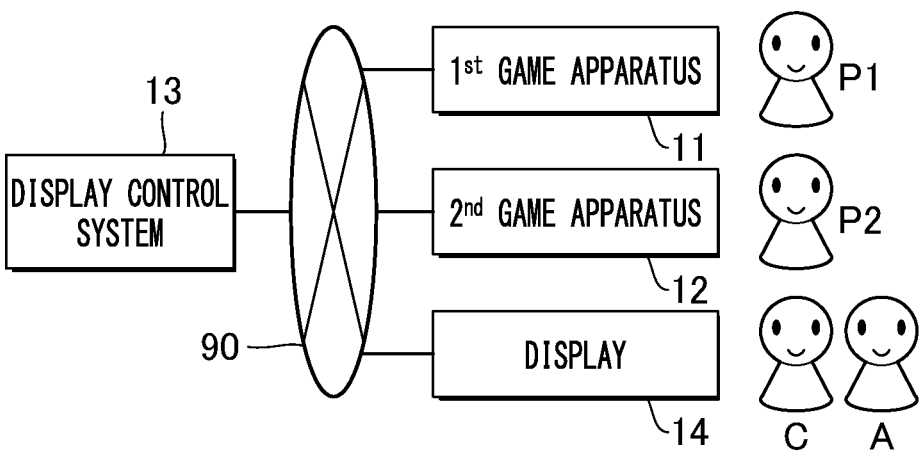
FIG. 13 is a block diagram showing an example of a configuration of a game system according to a modification.
FIG. 14 is a schematic diagram showing an example of how a situation message is displayed according to a modification.

(2) In the foregoing embodiments, the first game apparatus 11 and the second game apparatus 12 are configured to be included in the display control system 13. However, as shown in FIG. 13, the first game apparatus 11 and the second game apparatus 12 may be independent of the display control system 13, and these may be installed in the specific facility. For example, the display control system 13 is achieved by a server apparatus installed outside the specific facility. In the configuration shown in FIG. 13, the display control system 13 communicates with the first game apparatus 11 and the second game apparatus 12 via a communication network 90 such as the Internet. For example, the display control system 13 receives the situation data X from the first game apparatus 11 and the second game apparatus 12 via the communication network 90.

In the first embodiment, an example has been described in which the display 14 is configured to be included in the display control system 13. As shown in FIG. 13, the display 14 may be independent of the display control system 13 and these may be installed in the specific facility. In the configuration shown in FIG. 13, the display control system 13 communicates with the display 14 via the communication network 90. For example, the display control system 13 sends the display data Y to the display 14 using the communication network 90.

(3) In the foregoing embodiments, an example configuration has been described in which the display control system 13 includes the generation processor 50. However, the location of the generation processor 50 in the game system 10 is not limited to that of the display control system 13. For example, the generation processor 50 may be installed in the first game apparatus 11 or the second game apparatus 12.

(4) Multiple situation messages M generated by the generation processor 50 may be selectively displayed on each of the commentary-use displays. Specifically, the commentator C registers a condition of a desired situation message M (hereinafter, "extraction condition") in the display control system 13. The display controller 60 displays, on the commentary-use displays, at least one situation message M that satisfies the extraction condition among multiple situation messages M generated by the generation processor 50, but it does not display the others. According to this configuration, the commentator C is able to selectively obtain only necessary situation messages M.

In the configuration in which situation messages M are displayed on each of the commentary-use displays by the display controller 60, each of the situation messages M to be displayed by the display controller 60 may be different for each commentary-use display. For example, on the commentary-use display that is viewed by audience members A who cheer the player P1, situation messages M relating to the player P1 are selectively displayed from among multiple situation messages M generated by the generation processor 50. On the commentary-use display that is viewed by audience members A who cheer the player P2, situation messages M relating to the player P2 are selectively displayed. On the display 21 of the terminal apparatus 20 used by the commentator C, all of the situation messages M are displayed.

(5) A situation message M may belong to any of multiple layers. The deeper the layer, the more the situation message M is specifically expressed by text representative of the situation of the competitive game. For example, a situation message M that belongs to the layer 1 represents the phrase "Player wins the game!" A situation message M that belongs to the layer 2, which is lower than the layer 1, represents the phrase "Player A has defeated player B!" A situation message M that belongs to the layer 3, which is lower than the layer 2, represents the phrase "Player A has defeated player B twice in a row!" The layer 1 is an example of a "first layer" and the layer 2 is an example of a "second layer. Alternatively, the layer 2 is an example of a "first layer" and the layer 3 is an example of a "second layer.

The display controller 60 displays, on each of the commentary-use displays, the situation message M of the layer specified by the commentator C from among the multiple layers. For example, the generation processor 50 generates a situation message M1 that belongs to the layer 1 (alternatively, the layer 2), and it generates a situation message M2 that belongs to the layer 2 (alternatively, the layer 3). When the layer 1 is selected by the commentator C, the first display controller 60 displays the situation message M1 on the display 21. When the layer 2 is selected by the commentator C, the first display controller 60 displays the situation message M2 on the display 21.

Alternatively, the situation messages M across the multiple layers may be sent from the display control system 13 to the terminal apparatus 20. Furthermore, the situation message M of the layer specified by the commentator C may be selected by the terminal apparatus 20.

(6) How the situation messages M are displayed may be freely selectable. For example, the display controller 60 may display, on the display 21, situation messages M relating to the player P1 and the situation messages M relating to the player P2 in different ways (e.g., color).

Alternatively, these situation messages M may be displayed under a specific production effect. For example, as shown in FIG. 14, the display controller 60 moves situation messages M relating to the player P1 from the left to the second area Gc2. Furthermore, the display controller 60 moves a situation message M relating to the player P2 from the right to the second area Gc2.

According to this configuration, the commentator C is able to easily and visually distinguish between the situation messages M relating to the player P1 and the situation messages M relating to the player P2.

(7) In the foregoing embodiments, situation messages M are displayed on each of the commentary-use displays. However, spoken versions of situation messages M (hereinafter, "spoken guidance") may be output from a sound output device (e.g., speaker) of the terminal apparatus 20. Any known speech synthesis technique may be employed to generate the spoken guidance based on the situation messages M. According to this configuration, the commentator C is able to understand the situation of the competitive game by listening to the spoken guidance.

(8) In the foregoing embodiments, display data Y including image data Y1 and text data Y2 is sent from the display controller 60 to the commentary-use displays. However, the situation message M may be synthesized with the second game image Gb, and image data, as the image data Y, representative of a commentary image Gc that is obtained by the synthesizing may be sent from the display controller 60 to the commentary-use displays.

As will be understood from the above description, the display controller 60 according to the foregoing embodiments is one element, and it displays the second game image Gb and the situation messages M on the commentary-use displays.

(9) In the foregoing embodiments, the generation processor 50 of the display control system 13 generates text data Y2 representative of a situation message M. However, instead of progression data X2, situation data X including the text data Y2 may be sent from the first game apparatus 11 or the second game apparatus 12 to the display control system 13. That is, the function of the generation processor 50 that generates situation messages M may be included in the first game apparatus 11 or the second game apparatus 12.

(10) In the foregoing embodiments, an example configuration has been described in which the first area Gc1 and the second area Gc2 of the commentary image Gc are fixed, but these may be each an unfixed area.

That is, the forms of the first area Gc1 and the second area Gc2 or a positional relationship therebetween may change. For example, the second area Gc2 may be overlapped with a part of the first region Gc1 that is variable and depends on the progress of the competitive game, and these may be displayed. Alternatively, the size of the second area Gc2 may change based on the number of letters included in the situation message M.

(11) In the foregoing embodiments, an example competitive game has been described in which the players P1 and P2 play against each other. However, each embodiment is applied to a competitive game in which two groups, one for multiple players P1 and the other for multiple players P2, play against each other. For example, the game system 10 includes multiple first game apparatuses 11 and multiple second game apparatuses 12. Each of the first game apparatuses 11 corresponds to a different player P1. Each of the second game apparatuses 12 corresponds to a different player P2. The first game apparatuses 11 and the second game apparatuses 12 may be installed in one specific facility or each may be in a different facility.

Each of the first game apparatuses 11 displays, on the display 15, a first game image Ga representative of the situation of each of the players P1. Each of the second game apparatus 12 displays, on the display 15, the first game image Ga representing the situation of each of the players P2.

As described above, in a situation in which groups play against each other, the situation of the competitive game tends to be more complicated. Accordingly, the configuration for assisting the commentator C by displaying situation messages M is exceptionally effective.

In the foregoing embodiments, an example competitive game has been described in which each player P takes unit areas U. However, the types of games to which the present disclosure is applied are not limited to this example. Examples of games to which the present disclosure is applied include: a fighting game in which game characters operated by the players P fight each other; a sports game in which teams operated by the players P play against each other in sports, such as a baseball game and a soccer game; a competitive game in which the players P play against each other in a board game, such as Shogi and Igo; a card game in which each of the players P play against others using the player's own cards; and a lottery game in which each player P wins or loses a physical or electronic lottery.

In the foregoing embodiments, an example game has been described in which the games are played by multiple players P. However, the foregoing embodiments are applied to games played by only one player P.

In the foregoing embodiments, an example has been described in which the game system 10 includes the first game apparatus 11 and the second game apparatus 12. The number of game apparatuses included in the game system 10 is freely selected. For example, in one aspect, when a game is played by only one player P, one game apparatus is included in the game system 10. Furthermore, in one aspect, when the game is played by three or more players P, three or more game apparatuses are included in the game system 10.

Appendices

The following example aspects are derivable from the description described above. For improving understanding of the aspects, reference signs used in the drawings are shown in parentheses, but these are not intended to limit the present disclosure to the drawings.

Appendices A

In the technique of Patent Document 1, live content is redundant for audience members who are familiar with the game, and it is annoying.

In view of the circumstances described above, specific aspects of the present disclosure (Appendices A1 to A9) are to allow for a commentator to clearly describe a game, as well as to allow audience members to easily understand the situation of the game

Appendix A1

A display control system according to one aspect (Appendix A1) of the present disclosure includes: at least one memory for storing instructions and at least one processor that implements the instructions to: generate a situation message (M) representative of a situation of a game played by at least one player (P) using at least one game apparatus (11, 12); display the situation message on a first display (21) that is independent of the at least one game apparatus; and display, on a second display (31) that is independent of the at least one game apparatus, a game image (Gb) used to watch the situation of the game without displaying the situation message.

In this aspect, the commentator (C) is able to clearly describe the situation of the game by referring to the situation message (M) displayed on the first display (21). In contrast, audience members (A) who are familiar with the game are able to easily understand the situation of the game without being annoyed by display of the situation message (M). That is, the commentator (C) is able to clearly describe the game as well as the audience members (A) can easily understand the situations of the game.

The "situation of the game" refers to one which changes from moment to moment as the game progresses. Examples of the "situation of the game" include: occurrences or ends of various events in the game; elapsed time in the game (e.g., "10 minutes elapsed"); results of the game (final or intermediate results); and a situation of each player (P) in the game (whether each player P is winning the game).

The type of the "game" is freely selectable. However, given that a situation of the game is described by the commentator (C), a competitive game in which multiple players (P) play against each other is particularly preferable.

The "game image (Gb)" is an image that is used to watch the situation of the game by the audience members (A). For example, the following game images (Gb) are displayed on the second display (31): an image similar to the game image (Gb) displayed on at least one game apparatus (11, 12) used by the player (P); a game image generated from the game image (Gb); and an image generated independently of the game image (Gb).

The second display controller (62) includes any of the following processing: (i) displaying, on the second display (31), a game image (Gb) to be displayed on at least one game apparatus (11, 12) operated by the player (P); (ii) displaying, on the second display (31), a game image (Gb) generated by processing of the game image (Gb); and (iii) sending the second display (31) progression data representative of the situation of the game to generate a game image (Gb) based on the situation of the game or to display the game image (Gb) on the second display (31). The game image (Gb) may be either a moving image or a still image.

The "displays (21, 31) are independent of the at least one game apparatus (11, 12)" means that the game apparatuses (11, 12) and the displays (21, 31) are individual devices separated from each other. For example, a relation in which housings of the game apparatuses (11, 12) and housing of the displays (21, 31) are made of individual parts means "independent." When the game apparatuses (11, 12) are movable independently of the displays (21, 31), and vice versa, a relationship between the two is "independent." Even when the game apparatuses (11, 12) and the displays (21, 31) are connected to each other by, for example, flexible signal lines, as long as each is movable independently of the others, the relationship between the game apparatuses (11, 12) and the displays (21, 31) is "independent."

The relationship between at least one player (P) and at least one game apparatus (11, 12) is freely selectable. For example, one game apparatus (11 or 12) may be used by one player (P), or one game apparatus (11 or 12) may be used by multiple players (P). Furthermore, each of the game apparatuses (11, 12) may be used by one or more players (P).

Appendix A2

In a specific example (Appendix A2) according to the Appendix A1, the at least one processor implements the instructions to display the situation message and the game image on the first display.

According to this aspect, the commentator (C) who uses the first display (21) is able to check the situation message (M) in addition to the game image (Gb). Accordingly, the commentator (C) is able to clearly describe the situation of the game, which has remarkable effects.

Appendix A3

In a specific example (Appendix A3) according to the Appendix A2, the at least one processor implements the instructions to display, on the first display, an image including: a fixed first area (Gc1) in which the game image is disposed; and a fixed second area (Gc2) in which the situation message is disposed.

According to this aspect, compared to a configuration in which positions or areas of the first area (Gc1) and the second area (Gc2) are changed, the commentator (C) is able to easily check the game image (Gb) and the situation message (M).

The "fixed" first area (Gc1) and the "fixed" second area (Gc2) mean that forms (e.g., sizes and shapes) and positions of the first area (Gc1) and the second area (Gc2) remain unchanged.

Appendix A4

In a specific example (Appendix A4) according to any one of the Appendices A1 to A3, the at least one processor implements the instructions to: obtain situation data representative of the situation of the game from the at least one game apparatus; and generate the situation message (M) based on the situation data.

In this aspect, the situation message (M) is generated based on the situation data (X) obtained from at least one game apparatuses (11, 12). Accordingly, the accurate situation message (M) can be generated describing the situation of the game.

Appendix A5

In a specific example (Appendix A5) according to any one of the Appendices A1 to A4, the situation message relates to a specific situation of the game. The at least one processor implements the instructions to: generate the situation message relating to the specific situation before the game is progressed to the specific situation, and display the situation message relating to the specific situation on the first display before the game is progressed to the specific situation.

According to this aspect, it is possible to give a predictive description on the immediately following or future situation of the game. Alternatively, it is possible to give a description of the situation of the game without delay relative to the progress of the game.

Appendix A6

In a specific example (Appendix A6) according to any one of the Appendices A1 to A5, the at least one processor implements the instructions to display the situation message on the first display in a first operation mode, and, not to display the situation message on the first display in a second operation mode.

According to this aspect, the display of the situation message (M) is switched on or off based on the operation mode. In a situation in which the commentator (C) describes the situation of the game (e.g., game competition), the first operation mode in which the situation message (M) is displayed is suitable.

Appendix A7

A game system (10) according to one aspect (Appendix A7) of the present disclosure includes: at least one game apparatus (11, 12) that is used by at least one player (P) to play a game; and a display control system configured to communicate with the at least one game apparatus, in which the display control system includes: at least one memory for storing instructions and at least one processor that implements the instructions to: generate a situation message (M) representative of a situation of the game played by the at least one player; display the situation message on a first display that is independent of the at least one game apparatus; and display, on a second display that is independent of the at least one game apparatus, a game image (Gb) used to watch the situation of the game without displaying the situation message.

Appendix A8

A computer-implemented display control method according to one aspect (Appendix A8) of the present disclosure includes: generating a situation message (M) representative of a situation of a game played by at least one player (P) using at least one game apparatus (11, 12); displaying the situation message on a first display (21) that is independent of the at least one game apparatus; and displaying, on a second display (31) that is independent of the at least one game apparatus, a game image (Gb) used to watch the situation of the game without displaying the situation message.

Appendix A9

A non-transitory computer-readable recording medium, according to one aspect (Appendix A9) of the present disclosure, having instructions stored therein that cause at least one processor of a computer system to: generate a situation message (M) representative of a situation of a game played by at to least one player (P) using at least one game apparatus (11, 12); display the situation message on a first display (21) that is independent of the at least one game apparatus; and display, on a second display (31) that is independent of the at least one game apparatus, a game image (Gb) used to watch the situation of the game without displaying the situation message.

APPENDICES B

In the technique of Patent Document 1, in which live content is included in a game image, the commentator or audience members are not able to see a part of the game image in which the content is included. Accordingly, they are not be able to understand the accurate game image in some cases.

In view of the circumstances described above, specific aspects of the present disclosure (Aspects B1 to B8) is to allow for a commentator or audience members to easily and accurately understand the situation of the game situation.

Appendix B1

A display control system (13) according to one aspect the present disclosure (Appendix B1) includes: a generation processor (50) configured to generate a situation message (M) representative of a situation of a game played by at least one player (P); a display controller (60) configured to display, on a display (14, 21), an image (Gc) including a fixed first area (Gc1) in which a game image (Gb) used to watch the situation of the game, and a fixed second area (Gc2) in which the situation message (M) is disposed.

In this aspect, audience members (A) or a commentator (C) is able to easily understand an accurate situation of the game by referring to the situation message (M) and the game image (Gb). Furthermore, the first area (Gc1) and the second area (Gc2) are fixed. Accordingly, compared to a configuration in which sizes or positions of the first area (Gc1) and the second area (Gc2) are changed, the commentator (C) or the audience members (A) are able to easily check the game image (Gb) and the situation message (M). For example, audience members (A) who have an enough skill to understand the accurate situation of the game using the game image (Gb) without checking the situation message (M) are able to concentrate on the game image (Gb) fixed in the first area (Gc1). That is, commentator (C) or audience members (A) who are not familiar with the game as well as audience members (A) who are familiar with the game are able to easily understand the situation of the game.

The "fixed" first area (Gc1) and the "fixed" second area (Gc2) mean that forms (e.g., sizes and shapes) and positions of the first area (Gc1) and the second are (Gc2) remain unchanged.

Appendix B2

In a specific example (Appendix B2) according to Appendix B1, the generation processor (50) is configured to obtain situation data (X) representative of the situation of the game from at least one game apparatus (11, 12) used by the at least one player (P), and generate the situation message (M) based on the situation data (X).

In this aspect, the situation message (M) is generated based on the situation data (X) obtained from the at least one game apparatus (11, 12). Accordingly, an accurate situation message (M) describing the situation of the game can be displayed on the displays (14, 21).

Appendix B3

In a specific example (Appendix B3) according to Appendix B1 or B2, the generation processor (50) is configured to generate the game image (Gb) and the situation message (M) based on the situation data (X) representative of the situation of the game.

In this aspect, the situation data (X) is used for both the generation of the game image (Gb) and the situation message (M). Accordingly, compared to a configuration in which the situation message (M) is generated independently of the game image (Gb), load on processing is reduced.

Appendix B4

In a specific example (Appendix B4) according to any one of the Appendices B1 to B3, the generation processor (50) is configured to generate the situation message (M) relating to the situation before the game is progressed to the specific situation, and the first display controller (60) is configured to display the situation message (M) on the display (14, 21).

According to this aspect, it is possible to give a predictive description of the immediately following or future situation of the game. Alternatively, it is possible to give a description of the situation of the game without delay relative to the progress of the game.

Appendix B5

In a specific example (Appendix B5) according to any one of the Appendices B1 to B4, the display controller (60) is configured to display the situation message (M) on the display (14, 21) in a first operation mode, and is configured not to display the situation message (M) on the display (14, 21) in a second operation mode.

According to this aspect, the display of the situation message (M) is switched on or off based on the operation mode. In a situation in which the commentator (C) describes the situation of the game (e.g., game competition), the first operation mode in which the situation message (M) is displayed is suitable.

Appendix B6

A game system (10) according to one aspect (Appendix B6) of the present disclosure includes: at least one game apparatus (11, 12) that is used by at least one player (P) to play a game; a display control system (13) configured to communicate with the at least one game apparatus (11, 12), in which the display control system (13) includes: a generation processor (50) configured to generate a situation message (M) representative of a situation of a game played by the at least one player (P); a display controller (60) configured to display, on a display (14, 21), an image (Gc) including a fixed first area (Gc1) in which a game image (Gb) used to watch the situation of the game, and a fixed second area (Gc2) in which the situation message (M) is disposed.

Appendix B7

A display control method according to one aspect (Appendix B7) of the present disclosure includes: generating a situation message (M) representative of a situation of a game played by at least one player (P); displaying, on a display (14, 21), an image (Gc) including a fixed first area (Gc1) in which a game image (Gb) used to watch the situation of the game, and a fixed second area (Gc2) in which the situation message (M) is disposed.

Appendix B8

A program according to one aspect (Appendix B8) of the present disclosure that causes a computer system to function as: a generation processor (50) configured to generate a situation message (M) representative of a situation of a game played by at least one player (P); a display controller (60) configured to display, on a display (14, 21), an image (Gc) including a fixed first area (Gc1) in which a game image (Gb) used to watch the situation of the game, and a fixed second area (Gc2) in which the situation message (M) is disposed.

Appendix A10

In a specific example (Appendix A10) according to the Appendix A1, the situation message displayed on the first display is a message for a commentator.

Appendix A11

In a specific example (Appendix A11) according to the Appendix A1, the game image displayed on the second display is an image for an audience member.

Appendix A12

In a specific example (Appendix A12) according to the Appendix A1, the situation message indicates a start or a result of an event of the game played by the at least one player.

Appendix A13

In a specific example (Appendix A13) according to the Appendix A1, the situation message indicates a situation of competition in an event of the game.

Appendix A14

In a specific example (Appendix A14) according to the Appendix A1, the situation message indicates whether the at least one player is dominant in the game.

Appendix A15

In a specific example (Appendix A15) according to the Appendix A1, the at least one game apparatus includes: a first game apparatus; and a second game apparatus, in which the at least one processor implements the instructions to: obtain first situation data representative of a situation of the game from the first game apparatus; generate a first situation message as the situation message based on the first situation data; obtain second situation data representative of a situation of the game from the second game apparatus; and generate a second situation message as the situation message based on the second situation data.

Appendix A16

In a specific example (Appendix A16) according to the Appendix A1, the at least one game apparatus includes: a first game apparatus; and a second game apparatus, in which the situation message includes: a fixed part; and a variable part, and in which the at least one processor implements the instructions to: obtain first situation data representative of a situation of the game from the first game apparatus; generate a first situation message as the situation message based on: the first situation data; a fixed part corresponding to the first situation data; and a variable part corresponding to the first situation data; obtain second situation data representative of a situation of the game from the second game apparatus; and generate a second situation message as the situation message based on: the second situation data; a fixed part corresponding to the second situation data; and a variable part corresponding to the second situation data.

Appendix A17

In a specific example (Appendix A17) according to the Appendix A1, the at least one game apparatus includes: a first game apparatus; and a second game apparatus, in which the situation message includes: a fixed part; and a variable part, and in which the at least one processor implements the instructions to: obtain first situation data representative of a situation of the game from the first game apparatus; generate a first situation message as the situation message based on: the first situation data; a fixed part corresponding to the first situation data; and a variable part corresponding to the first situation data; obtain second situation data representative of a situation of the game from the second game apparatus; generate a second situation message as the situation message based on: the second situation data; a fixed part corresponding to the second situation data; and a variable part corresponding to the second situation data, and display the first and second situation messages on the first display before the game is progressed to a specific situation.

Appendix A18

In a specific example (Appendix A18) according to the Appendix A1, the at least one processor implements the instructions to: generate a first situation message that belongs to a first layer as the situation message; generate a second situation message that belongs to a second layer as the situation message; display the first situation message on the first display based on the first layer being selected; and display the second situation message on the first display based on the second layer being selected.

Description of Reference Signs

10 . . . game system, 11 . . . first game apparatus, 12 . . . second game apparatus, 13 . . . display control system, 14 . . . display, 15 . . . display, 16 . . . operating device, 20 . . . terminal apparatus, 21 . . . display, 22 . . . sound receiver, 30 . . . terminal apparatus, 31 . . . display, 32 . . . sound output device, 50 . . . generation processor, 60 . . . display controller, 61 . . . first display controller, 62 . . . second display controller, 90 . . . communication network, 131 . . . controller, 132 . . . storage device, 133 . . . communicator, A . . . audience member, C . . . commentator, Ga . . . first game image, Gb . . . second game image, Gb1 . . . area, Gb2 . . . area, Gb3 . . . area, Gc . . . commentary image, Gc1 . . . first area, Gc2 . . . second area, M . . . situation message, P(P1, P P2) . . . player, T . . . conversion table, U . . . unit area, V . . . audio data, X . . . situation data, X1 . . . image data, X2 . . . progression data, Y . . . display data, Y1 . . . image data, Y2 . . . text data, Z . . . playback data, g1 . . . situation image, g2 . . . image for search.

What is claimed is:

1. A display control system comprising:
   at least one memory for storing instructions; and
   at least one processor that implements the instructions to:
   generate a situation message representative of a real time situation of a game that is being played by at least one player who uses at least one game apparatus;
   display, on a first display that is provided for a commentator and is independent of a display of the at least one game apparatus, the situation message before or concurrently with a progress of the game that is being played; and
   display, on a second display that is provided for one or more audience members and is independent of the display of the at least one game apparatus, the progress of the game that is being played by the at least one player without displaying the situation message.

2. The display control system according to claim 1, wherein the at least one processor implements the instructions to display the situation message and the game image on the first display.

3. The display control system according to claim 2, wherein the at least one processor implements the instructions to display, on the first display, an image including:
   a fixed first area in which the game that is being played is disposed; and
   a fixed second area in which the situation message is disposed.

4. The display control system according to claim 1, wherein the at least one processor implements the instructions to:
   obtain situation data representative of the real time situation of the game from the at least one game apparatus; and
   generate the situation message based on the situation data.

5. The display control system according to claim 1, wherein the situation message relates to a specific situation of the game,
   wherein the at least one processor implements the instructions to:

generate the situation message relating to the specific situation before the game is progressed to the specific situation, and display the situation message relating to the specific situation on the first display before the game is progressed to the specific situation.

6. The display control system according to claim 1, wherein the at least one processor implements the instructions to display the situation message on the first display in a first operation mode, and, not to display the situation message on the first display in a second operation mode.

7. The display control system according to claim 1, wherein the situation message displayed on the first display is a commentator message including commentary on the real time situation of the game.

8. The display control system according to claim 1, wherein the progress of the game that is being played by the at least one player is included in a an audience image that is displayed on the second display.

9. The display control system according to claim 1, wherein the situation message indicates a start or a result of an event of the game played by the at least one player.

10. The display control system according to claim 1, wherein the situation message indicates a situation of competition in an event of the game.

11. The display control system according to claim 1, wherein the situation message indicates whether the at least one player is dominant in the game.

12. The display control system according to claim 1, wherein the at least one game apparatus includes:
a first game apparatus; and
a second game apparatus, wherein the at least one processor implements the instructions to:
obtain first situation data representative of a situation of the game from the first game apparatus;
generate a first situation message as the situation message based on the first situation data;
obtain second situation data representative of a situation of the game from the second game apparatus; and
generate a second situation message as the situation message based on the second situation data.

13. The display control system according to claim 1, wherein the at least one game apparatus includes:
a first game apparatus; and
a second game apparatus,
wherein the situation message includes:
a fixed part; and
a variable part, and
wherein the at least one processor implements the instructions to:
obtain first situation data representative of a situation of the game from the first game apparatus;
generate a first situation message as the situation message based on:
the first situation data;
a fixed part corresponding to the first situation data; and
a variable part corresponding to the first situation data;
obtain second situation data representative of a situation of the game from the second game apparatus; and
generate a second situation message as the situation message based on:
the second situation data;
a fixed part corresponding to the second situation data; and
a variable part corresponding to the second situation data.

14. The display control system according to claim 1, wherein the at least one game apparatus includes:
a first game apparatus; and
a second game apparatus,
wherein the situation message includes:
a fixed part; and
a variable part, and
wherein the at least one processor implements the instructions to:
obtain first situation data representative of a situation of the game from the first game apparatus;
generate a first situation message as the situation message based on:
the first situation data;
a fixed part corresponding to the first situation data; and
a variable part corresponding to the first situation data;
obtain second situation data representative of a situation of the game from the second game apparatus;
generate a second situation message as the situation message based on:
the second situation data;
a fixed part corresponding to the second situation data; and
a variable part corresponding to the second situation data, and
display the first and second situation messages on the first display before the game is progressed to a specific situation.

15. The display control system according to claim 1, wherein the at least one processor implements the instructions to:
generate a first situation message that belongs to a first layer as the situation message;
generate a second situation message that belongs to a second layer as the situation message;
display the first situation message on the first display when the first layer is selected; and
display the second situation message on the first display when the second layer is selected.

16. A computer-implemented display control method comprising:
generating a situation message representative of a real time situation of a game being played by at least one player who uses at least one game apparatus;
displaying, on a first display that is provided for a commentator and is independent of a display of the at least one game apparatus, the situation message before or concurrently with a progress of the game that is being played; and
displaying, on a second display that is provided for one or more audience members and is independent of the display of the at least one game apparatus, the progress of the game that is being played by the at least one player without displaying the situation message.

17. A non-transitory computer-readable recording medium having instructions stored therein that cause at least one processor of a computer system to:
generate a situation message representative of a real time situation of a game being played by at least one player who uses at least one game apparatus;
display, on a first display that is provided for a commentator and is independent of a display of the at least one game apparatus, the situation message before or concurrently with a progress of the game that is being played; and
display, on a second display that is provided for one or more audience members and is independent of the display of the at least one game apparatus, the progress of the game that is being played by the at least one player without displaying the situation message.

* * * * *